United States Patent
Kuo et al.

(10) Patent No.: US 8,605,803 B2
(45) Date of Patent: Dec. 10, 2013

(54) METHODS AND APPARATUS FOR REDUCING UPLINK MULTI-BASE STATION INTERFERENCE

(75) Inventors: Ping-Heng Kuo, Pingtung (TW); Pang-An Ting, Fongyuan (TW)

(73) Assignee: Industrial Technology Research Institute, Chutung, Hsinchu (TW)

( * ) Notice: Subject to any disclaimer, the term of this patent is extended or adjusted under 35 U.S.C. 154(b) by 485 days.

(21) Appl. No.: 12/831,589

(22) Filed: Jul. 7, 2010

(65) Prior Publication Data

US 2011/0222615 A1 Sep. 15, 2011

Related U.S. Application Data

(60) Provisional application No. 61/313,968, filed on Mar. 15, 2010.

(51) Int. Cl.
*H04L 27/28* (2006.01)

(52) U.S. Cl.
USPC .......................................... 375/260; 375/299

(58) Field of Classification Search
USPC .................................. 375/260, 299, 346–349
See application file for complete search history.

(56) References Cited

U.S. PATENT DOCUMENTS

| | | | |
|---|---|---|---|
| 7,483,719 B2 * | 1/2009 | Kim et al. .................. | 455/562.1 |
| 2007/0126633 A1 | 6/2007 | Lee | |
| 2008/0051145 A1 | 2/2008 | Jin | |
| 2008/0075037 A1 | 3/2008 | Guo et al. | |
| 2008/0188190 A1 | 8/2008 | Prasad et al. | |
| 2008/0225964 A1 * | 9/2008 | Han et al. ...................... | 375/260 |
| 2008/0309554 A1 | 12/2008 | Venkatesan | |
| 2009/0207822 A1 | 8/2009 | Kim et al. | |
| 2009/0215480 A1 | 8/2009 | Kim et al. | |
| 2010/0014690 A1 * | 1/2010 | Wolff et al. ...................... | 381/92 |
| 2010/0069010 A1 | 3/2010 | Karakayali et al. | |
| 2010/0150132 A1 * | 6/2010 | Ku .................. | 370/351 |
| 2010/0295762 A1 * | 11/2010 | Yeom et al. ..................... | 345/87 |
| 2010/0309854 A1 * | 12/2010 | Wu et al. ....................... | 370/329 |
| 2011/0150132 A1 * | 6/2011 | Kim et al. ..................... | 375/296 |
| 2011/0218001 A1 * | 9/2011 | Chien et al. ................... | 455/501 |
| 2012/0108278 A1 * | 5/2012 | Kim et al. ..................... | 455/501 |
| 2012/0329498 A1 * | 12/2012 | Koo et al. ..................... | 455/501 |

* cited by examiner

*Primary Examiner* — Emmanuel Bayard

(74) *Attorney, Agent, or Firm* — Finnegan, Henderson, Farabow, Garett & Dunner, LLP

(57) ABSTRACT

Method and apparatus for generating a precoder for uplink transmission from a mobile station. The method includes receiving information corresponding to a first precoding matrix and a second precoding matrix, and generating the precoder by linearly combining the first precoding matrix and the second precoding matrix. In the method, the first precoding matrix maximizes a transmission power between the mobile station and a serving base station, and the second precoding matrix minimizes an average interference value between the mobile station and at least two neighboring base stations.

6 Claims, 4 Drawing Sheets

METHODS AND APPARATUS FOR REDUCING UPLINK MULTI-BASE STATION INTERFERENCE

PRIORITY

This application claims the benefit of priority of U.S. Provisional Application No. 61/313,968, filed Mar. 15, 2010, the content of which is incorporated by reference herein in its entirety for any purpose.

TECHNICAL FIELD

The present disclosure relates generally to methods and apparatus for communication and, more particularly, to methods and apparatus for uplink multi-base station (multi-BS) interference mitigation where more than one neighboring base station (BS) is involved.

BACKGROUND

Wireless communication systems allow wireless devices to communicate without the necessity of wired connections. Because wireless systems have become so integrated into daily life, there is a growing demand for wireless communication systems that support multimedia services, such as speech, audio, video, file and Web downloading, and the like. Various wireless communication protocols and transmission control mechanisms have been developed to meet the growing demands of multimedia services over wireless communication networks and to improve the performance of these multimedia services.

In wireless communication systems, multiple-input and multiple-output (MIMO), a form of smart antenna technology, involves the use of multiple antennas at both the transmitter and receiver to improve communication performance. Beamforming, a signal processing technique used for directional signal transmission and/or reception, may be used to improve transmission and reception gains. In beamforming, spatial selectivity is achieved by using adaptive or fixed receive/transmit beampatterns.

Precoding is a generalized beamforming technique used to support multi-layer transmission in MIMO systems. When a receiver has multiple antennas, precoding is used for multi-layer beamforming in order to maximize the throughput performance of a multiple receiver antenna system. When a transmitter has multiple antennas, precoding is used to emit signals from the transmit antennas with independent and appropriate weighting per each antenna such that the link throughput is maximized at the receiver output.

In uplink transmissions, neighboring BSs might suffer from strong interference, especially when a mobile station (MS) or other form of terminal is located at BS cell edges.

The disclosed embodiments are directed to overcoming one or more of the problems set forth above.

SUMMARY

In one exemplary embodiment, the present disclosure is directed to a method for generating a precoder for uplink transmission from a mobile station, comprising: receiving information corresponding to a first precoding matrix and a second precoding matrix; and generating the precoder by linearly combining the first precoding matrix and the second precoding matrix, wherein the first precoding matrix maximizes a transmission power between the mobile station and a serving base station, and the second precoding matrix minimizes an average interference value between the mobile station and at least two neighboring base stations.

In another exemplary embodiment, the present disclosure is directed to an apparatus for generating a precoder for uplink transmission to a plurality of base stations, the apparatus comprising: at least one memory to store data and instructions; and at least one processor configured to access the at least one memory and, when executing the instructions, to: receive information corresponding to a first precoding matrix and a second precoding matrix; and generate the precoder by linearly combining the first precoding matrix and the second precoding matrix, wherein the first precoding matrix maximizes a transmission power between the mobile station and a serving base station, and the second precoding matrix minimizes an average interference value between the mobile station and at least two neighboring base stations.

In one exemplary embodiment, the present disclosure is directed to a method for generating a precoder for uplink transmission from a mobile station, comprising: receiving information corresponding to a first precoding matrix and a second precoding matrix; and generating the precoder by linearly combining the first precoding matrix and the second precoding matrix, wherein the first precoding matrix maximizes a transmission power between the mobile station and a serving base station, and the second precoding matrix minimizes a sum of an interference power between the mobile station and at least two neighboring base stations.

In another exemplary embodiment, the present disclosure is directed to an apparatus for generating a precoder for uplink transmission to a plurality of base stations, the apparatus comprising: at least one memory to store data and instructions; and at least one processor configured to access the at least one memory and, when executing the instructions, to: receive information corresponding to a first precoding matrix and a second precoding matrix; and generate the precoder by linearly combining the first precoding matrix and the second precoding matrix, wherein the first precoding matrix maximizes a transmission power between the mobile station and a serving base station, and the second precoding matrix minimizes a sum of an interference power between the mobile station and at least two neighboring base stations.

In one exemplary embodiment, the present disclosure is directed to a method for generating a precoder for uplink transmission from a mobile station, comprising: receiving information corresponding to a first precoding matrix; receiving information corresponding to at least two second precoding matrices, each of the at least two second precoding matrices corresponding to one of at least two neighboring base stations; receiving information corresponding to an interference sensitivity level (ISL) $\lambda_j$ for each of the at least two neighboring base stations; and generating the precoder by linearly combining the first precoding matrix and the at least two second precoding matrices, wherein the first precoding matrix maximizes transmission power between the mobile station and a serving base station, and the at least two second precoding matrices minimize interference power between the mobile station and a respective one of the neighboring base stations.

In another exemplary embodiment, the present disclosure is directed to an apparatus for generating a precoder for uplink transmission to a plurality of base stations, the apparatus comprising: at least one memory to store data and instructions; and at least one processor configured to access the at least one memory and, when executing the instructions, to: receive information corresponding to a first precoding matrix; receive information corresponding to at least two second precoding matrices, each of the at least two second precoding matrices corresponding to one of at least two neighboring base stations; receive information corresponding to an interference sensitivity level (ISL) $\lambda_j$ for each of the at least two neighboring base stations; and generate the precoder by linearly combining the first precoding matrix and the at least two second precoding matrices, wherein the first precoding matrix maximizes transmission power between the mobile station and a serving base station, and the at least two second precoding matrices minimize interference power between the mobile station and a respective one of the neighboring base stations.

In one exemplary embodiment, the present disclosure is directed to a method for generating a precoder for uplink transmission from a mobile station, comprising: receiving information corresponding to a first precoding matrix; receiving information corresponding to at least two second precoding matrices, each of the at least two second precoding matrices corresponding to one of at least two neighboring base stations; and generating the precoder by linearly combining the first precoding matrix and the at least two second precoding matrices, wherein the first precoding matrix maximizes transmission power between the mobile station and a serving base station, and the at least two second precoding matrices minimize interference power between the mobile station and a respective one of the neighboring base stations.

In another exemplary embodiment, the present disclosure is directed to an apparatus for generating a precoder for uplink transmission to a plurality of base stations, the apparatus comprising: at least one memory to store data and instructions; and at least one processor configured to access the at least one memory and, when executing the instructions, to: receive information corresponding to a first precoding matrix; receive information corresponding to at least two second precoding matrices, each of the at least two second precoding matrices corresponding to one of at least two neighboring base stations; and generate the precoder by linearly combining the first precoding matrix and the at least two second precoding matrices, wherein the first precoding matrix maximizes transmission power between the mobile station and a serving base station, and the at least two second precoding matrices minimize interference between the mobile station and a respective one of the neighboring base stations.

In one exemplary embodiment, the present disclosure is directed to a method for generating a precoder for uplink transmission from a mobile station in a wireless communication system, comprising: selecting, by a serving base station, a precoding matrix index (PMI); receiving, by the serving base station, information corresponding to at least partial channel state information of a plurality of neighboring base stations; selecting, by the serving base station, a minimum PMI ($PMI_{min}$); selecting, by the serving base station, a PMI combination ratio (PCR); and transmitting, by the serving base station, the PMI, PMImin, and the PCR to the mobile station to generate the precoder.

In another exemplary embodiment, the present disclosure is directed to an apparatus for generating a precoder for uplink transmission from a mobile station in a wireless communication system, the apparatus comprising: at least one memory to store data and instructions; and at least one processor configured to access the at least one memory and, when executing the instructions, to: select a precoding matrix index (PMI); receive information corresponding to at least partial channel state information of a plurality of neighboring base stations; select a minimum PMI ($PMI_{min}$); select a PMI combination ratio (PCR); and transmit the PMI, PMImin, and the PCR to the mobile station to generate the precoder.

In one exemplary embodiment, the present disclosure is directed to a method for generating a precoder for uplink transmission from a mobile station in a wireless communication system, comprising: selecting, by a serving base station, a precoding matrix index (PMI); receiving, by the serving base station, a set of sensitivity values, wherein each sensitivity value in the set of sensitivity values is received from a respective one of a plurality of neighboring base stations; receiving, by the serving base station, a set of minimum PMIs ($PMIs_{min}$), wherein each $PMI_{min}$ in the set of $PMIs_{min}$ is received from a respective one of the plurality of neighboring base stations; selecting, by the serving base station, a PMI combination ratio (PCR); and transmitting, by the serving base station, the PMI, the set of sensitivity values, the set of $PMIs_{min}$, and the PCR to the mobile station to generate the precoder.

In another exemplary embodiment, the present disclosure is directed to an apparatus for generating a precoder for uplink transmission from a mobile station in a wireless communication system, the apparatus comprising: at least one memory to store data and instructions; and at least one processor configured to access the at least one memory and, when executing the instructions, to: select a precoding matrix index (PMI); receive a set of sensitivity values, wherein each sensitivity value in the set of sensitivity values is received from a respective one of a plurality of neighboring base stations; receive a set of minimum PMIs ($PMIs_{min}$), wherein each $PMI_{min}$ in the set of $PMIs_{min}$ is received from a respective one of the plurality of neighboring base stations; select a PMI combination ratio (PCR); and transmit the PMI, the set of sensitivity values, the set of $PMIs_{min}$, and the PCR to the mobile station to generate the precoder.

DETAILED DESCRIPTION

Figure 1:
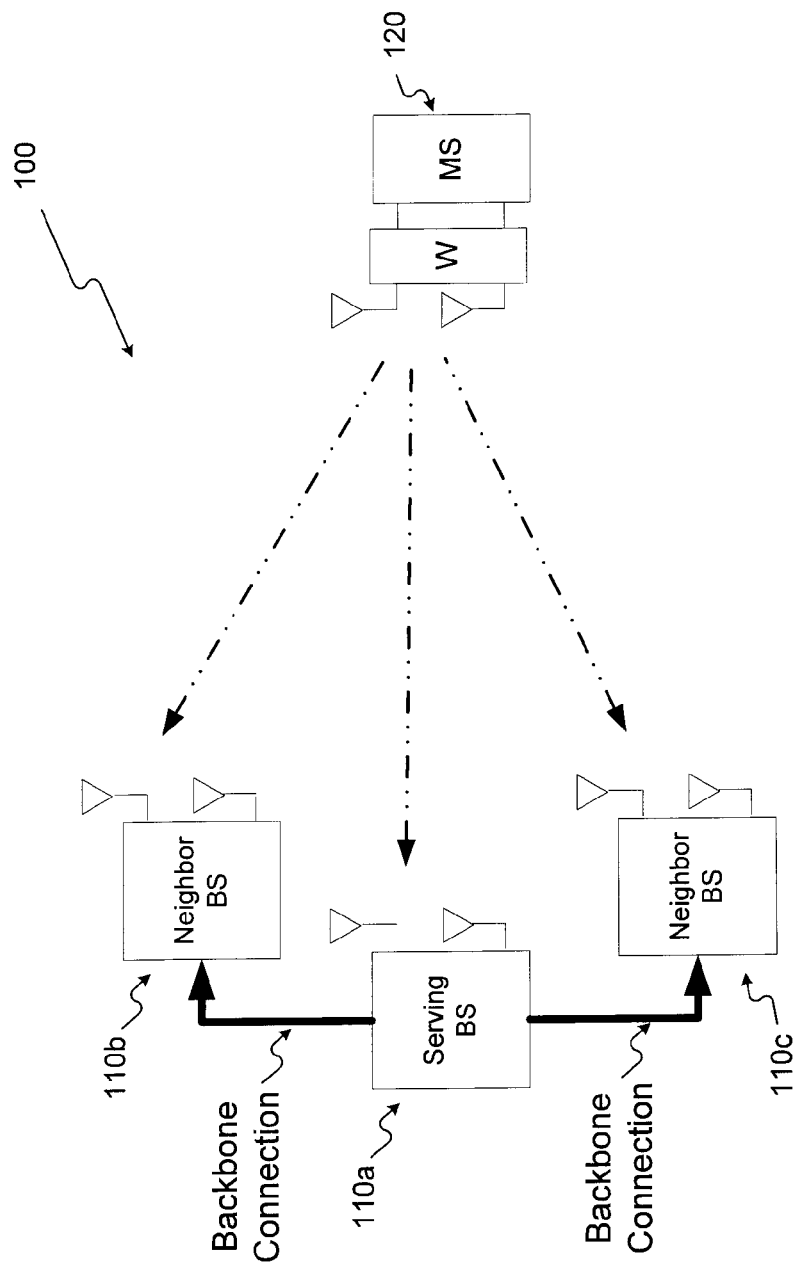
FIG. 1 is a diagram illustrating multiple-input multiple-output (MIMO) communication in an exemplary wireless communication system, consistent with certain disclosed embodiments.

FIG. 1 is a diagram of an exemplary multiple-input multiple-output (MIMO) wireless communication system 100. In one exemplary embodiment, wireless communication system 100 of FIG. 1 may be based, for example, on the Worldwide Interoperability for Microwave Access (WiMAX), which is promulgated by the WiMax Forum, and is based on the IEEE 802.16 family of standards and technologies. In other embodiments, wireless communication system 100 of FIG. 1 may be based, for example, on the $3^{rd}$ Generation Partnership Project (3GPP) family of standards and technologies. Wireless communication system 100 may be a multi-transmitter collaborative communication system. In some embodiments, wireless communication system 100 may be a multi-transmitter collaborative communication system having a single transmission device with multiple antenna elements. In other embodiments, wireless communication system 100 may be a multi-transmitter collaborative communication system having a set of transmission devices working in cooperation with each other. Unless otherwise specified, the present disclosure refers primarily to an embodiment in which a set of transmission devices work in cooperation with one another.

As shown in FIG. 1, wireless communication system 100 may include one or more transmission devices, referred to herein as base stations (BS) 110, e.g., BS 110a, BS 110b, and BS 110c, and one or more mobile stations (MS) 120. BS 110 may be any type of communication device configured to transmit and/or receive data and/or communications to and/or from one or more MSs 120 in wireless communication system 100, many of which are known in the art. In some embodiments, BS 110 may also be referred to as, for example, a Node-B, a base transceiver system (BTS), an access point, etc. In other embodiments, BS 110 may be a relay station, an intermediate node, an intermediary, or any type of mobile station. In one exemplary embodiment, BS 110 may have a broadcast/reception range within which BS 110 may wirelessly communicate with one or more one or more MSs 120. Broadcast ranges may vary due to power levels, location, and interference (physical, electrical, etc.).

Figure 2A:
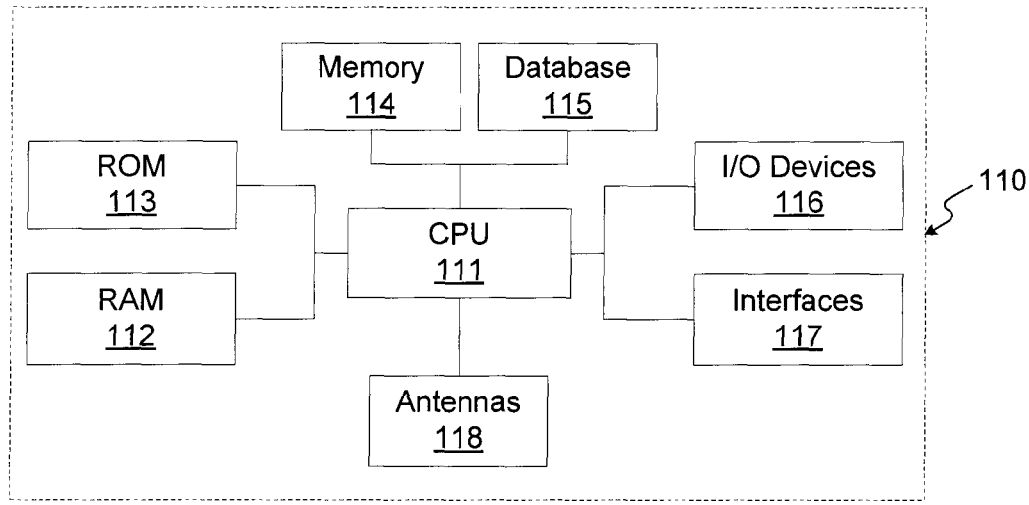
FIG. 2a is a diagram of an exemplary base station (BS), consistent with certain disclosed embodiments.

FIG. 2a is a diagram of an exemplary BS 110, consistent with certain disclosed embodiments. As shown in FIG. 2a, each BS 110 may include one or more of the following components: at least one central processing unit (CPU) 111 configured to execute computer program instructions to perform various processes and methods; random access memory (RAM) 112 and read only memory (ROM) 113 configured to access and store information and computer program instructions; memory 114 to store data and information; databases 115 to store tables, lists, or other data structures; I/O devices 116; interfaces 117; antennas 118; etc. Each of these components is well known in the art and will not be discussed further.

MS 120 may be any type of computing device configured to wirelessly transmit and/or receive data to and from BS 110 in wireless communication system 100. MS 120 may include, for example, servers, clients, desktop computers, laptop computers, network computers, workstations, personal digital assistants (PDA), tablet PCs, scanners, telephony devices, pagers, cameras, musical devices, etc. In addition, MS 120 may include one or more wireless sensors in a wireless sensor network configured to communicate by means of centralized and/or distributed communication. In one exemplary embodiment, MS 120 may be a mobile computing device. In another exemplary embodiment, MS 120 may be a fixed computing device operating in a mobile environment, such as, for example, a bus, a train, an airplane, a boat, a car, etc.

Figure 2B:
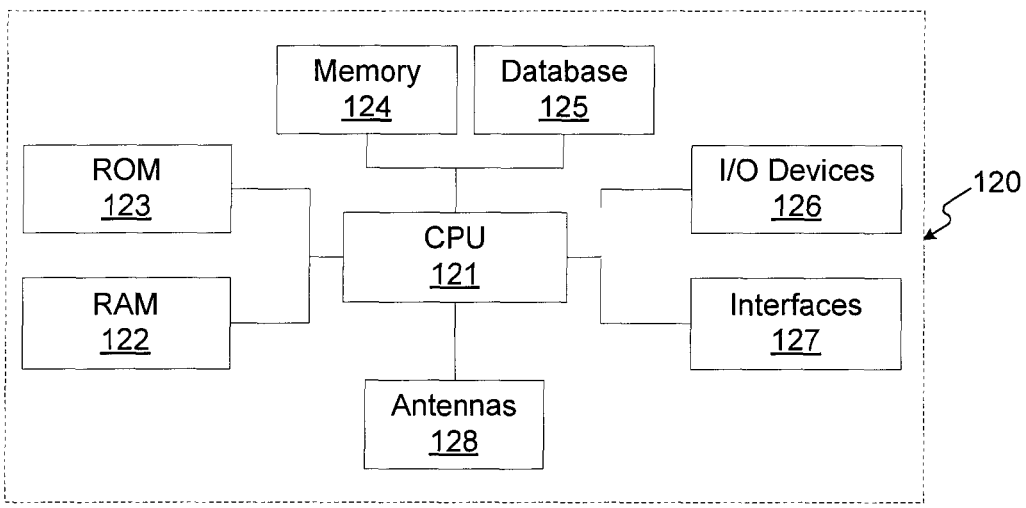
FIG. 2b is a diagram of an exemplary mobile station (MS), consistent with certain disclosed embodiments.

FIG. 2b is a diagram of an exemplary MS 120, consistent with certain disclosed embodiments. As shown in FIG. 2b, each MS 120 may include one or more of the following components: at least one central processing unit (CPU) 121 configured to execute computer program instructions to perform various processes and methods; random access memory (RAM) 122 and read only memory (ROM) 123 configured to access and store information and computer program instructions; memory 124 to store data and information; databases 125 to store tables, lists, or other data structures; I/O devices 126; interfaces 127; antennas 128; etc. Each of these components is well known in the art and will not be discussed further.

In the embodiment shown in FIG. 1, wireless communication system 100 may be a multi-user (MU) MIMO wireless communication system 100 in which multiple MSs 120 are concurrently served in the same time-frequency resource block, where the time-frequency resource block may be a basic scheduling unit in which both uplink and downlink signals are transmitted. In the embodiment of FIG. 1, uplink signals may be sent from one or more MSs 120 to a single BS 110, known as a serving BS 110. BS 110 may be considered to be the serving BS 110 to one or more MSs 120 when it is the primary physical unit by which the one or more MSs 120 may communicate with wireless communication system 100. In some embodiments, the serving BS 110 may change over time for any given MS 120 as, for example, may happen when a mobile MS 120 moves from within a broadcast/reception range serviced by one BS 110 to a broadcast/reception range serviced by another BS 110. In other embodiments, the embodiment illustrated in FIG. 1 may be implemented by a central control unit corresponding to a plurality of BSs 110. As shown in FIG. 1, MS 120 may include a precoder W.

Figure 3:
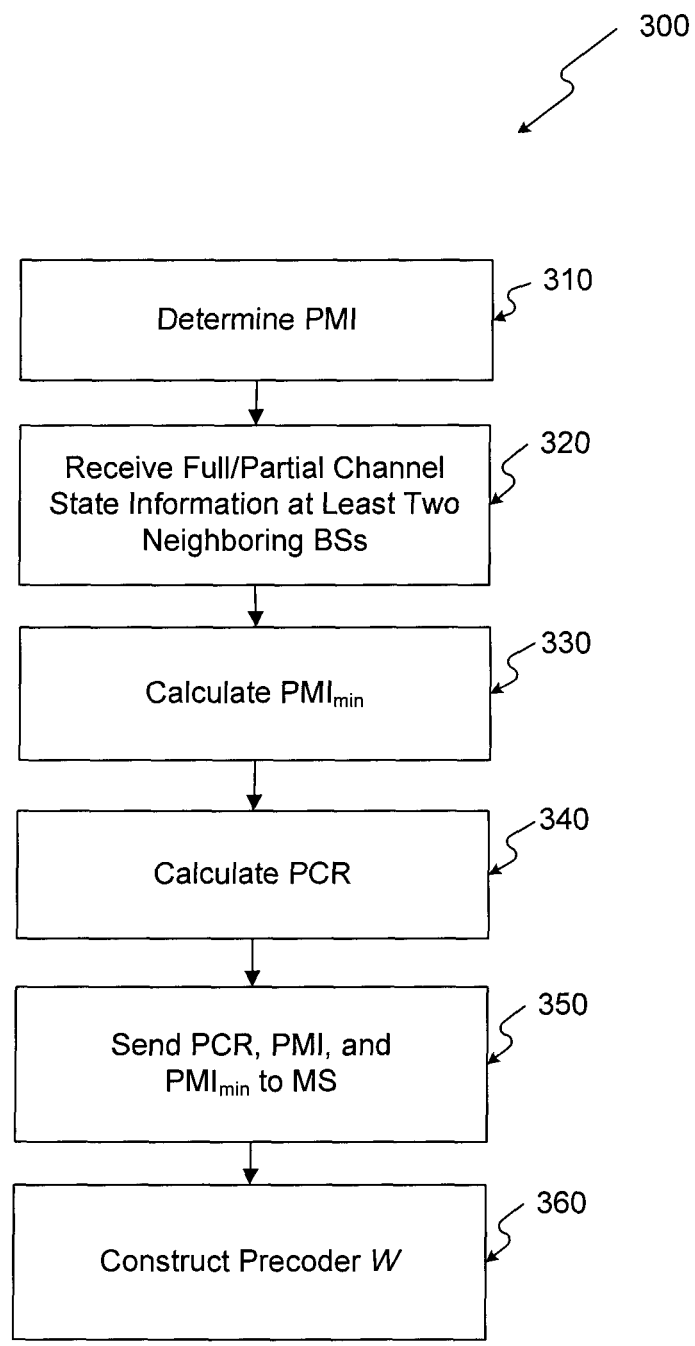
FIG. 3 is a flowchart illustrating exemplary wireless transmission and reception, consistent with certain disclosed embodiments.

FIG. 3 is an exemplary flowchart 300 illustrating data transmission in a wireless communication system, such as wireless communication system 100, consistent with certain disclosed embodiments. Specifically, FIG. 3 illustrates embodiments in which precoder combining is performed in wireless communication system 100 having multiple neighboring BSs 110. In the embodiments disclosed in FIG. 3, precoder codeword $W_{PMI_{min}}$ may be calculated, for example, based on an average interference value or a sum interference value, etc. In the embodiments of FIG. 3, precoder codeword $W_{PMI_{min}}$ may be computed differently using different types of channel state information. In addition, in wireless communication system 100, a codebook containing precoder codeword $W_{PMI_{min}}$ may be the same for each of serving BS 110, neighboring BSs 110, and MS 120.

As shown in FIG. 3, serving BS 110 may select a precoding matrix index (PMI) for a precoder codeword $W_{PMI}$ (310). In some embodiments, the PMI may be selected such that a maximum transmission power between an MS 120 and serving BS 110 may be achieved.

In addition, serving BS 110 may receive full or partial channel state information $H_j$ from at least two neighboring BSs 110 (320). In some embodiments, full or partial channel state information $H_j$ for each of the at least two neighboring BSs 110 may be communicated on a backbone communication channel to serving BS 110. Serving BS 110 may then calculate a minimum PMI ($PMI_{min}$) (330). $PMI_{min}$ may be an index associated with precoder codeword $W_{PMI_{min}}$.

In a first exemplary embodiment, precoder codeword $W_{PMI_{min}}$ may be calculated to minimize the average interference power between MS 120 and all of at least two neighboring BSs 110, according to Equation 1, as follows:

$$W_{PMI_{min}} = \operatorname*{argmin}_{i} \frac{1}{M} \sum_{j=1}^{M} \|H_j W_i\|^2 \qquad \text{Equation 1}$$

wherein $H_j$ denotes channel state information between MS 120 and a $j^{th}$ neighboring BSs 110;

M is the number of neighboring BSs 110; and $W_i$ is the precoding matrix associated with precoder codebook index i.

In a second exemplary embodiment, precoder codeword $W_{PMI_{min}}$ may be calculated as a precoder codeword that minimizes the sum interference to all of two or more neighboring BSs 110, according to Equation 2 as follows:

$$W_{PMI_{min}} = \underset{i}{\arg\min} \sum_{j=1}^{M} \|H_j W_i\|^2 \quad \text{Equation 2}$$

wherein $H_j$ denotes channel state information between MS 120 and at $j^{th}$ neighboring BS 110;

M is the number of neighboring BSs 110; and $W_i$ is the precoding matrix associated with precoder codebook index i.

In some embodiments, calculating precoder codeword $W_{PMI_{min}}$ to minimize the sum interference to two or more neighboring BSs 110 may offer a performance comparable to the first embodiment in which the average interference power is minimized, as discussed in connection with Equation 1 above, since a higher sum may be equivalent to a higher average when M is constant. In addition, calculating precoder codeword $W_{PMI_{min}}$ to minimize the sum interference to two or more neighboring BSs 110 may avoid numerical division, making it easier to implement in hardware.

In a third exemplary embodiment, precoder codeword $W_{PMI_{min}}$ may be chosen as a precoder codeword that minimizes the highest interference among the two or more neighboring BSs 110, according to Equation 3 as follows:

$$W_{PMI_{min}} = \underset{i}{\arg\min}\{\max(\|H_1 W_i\|^2, \|H_2 W_i\|^2, \ldots, \|H_M W_i\|^2)\} \quad \text{Equation 3}$$

wherein $H_j$ denotes channel state information between MS 120 and a $j^{th}$ neighboring BS 110;

M is the number of neighboring BSs 110; and $W_i$ is the precoding matrix associated with precoder codebook index i.

By selecting the highest interference as the metric, large differences between two or more neighboring BSs 110, e.g., when some of the neighboring BSs 110 suffer from more severe interferences while other neighboring BSs 110 are less severely affected by interference, may be minimized.

In a fourth exemplary embodiment, the precoder codeword that gives a minimum non-zero value of $\phi_i$ may be chosen as precoder codeword $W_{PMI_{min}}$. First, for each precoder codebook index i, a check may be performed according to Equation 4 as follows:

$$\xi = \frac{\max(\|H_1 W_i\|^2, \|H_2 W_i\|^2, \ldots, \|H_M W_i\|^2)}{\min(\|H_1 W_i\|^2, \|H_2 W_i\|^2, \ldots, \|H_M W_i\|^2)} \leq \Gamma \quad \text{Equation 4}$$

wherein $H_j$ denotes channel state information between MS 120 and a $j^{th}$ neighboring BS 110;

M is the number of neighboring BSs 110;

$W_i$ is the precoding matrix associated with precoder codebook index i; and $\Gamma$ is a predetermined threshold value.

Next, the value of $\phi_i$ may be calculated according to Equation 5, as follows:

$$\phi_i = \gamma_i \sum_{j=1}^{M} \|H_j W_i\|^2 \quad \text{Equation 5}$$

wherein $H_3$ denotes channel state information between MS 120 and a $j^{th}$ neighboring BS 110;

M is the number of neighboring BSs 110;

$W_i$ is the precoding matrix associated with precoder codebook index i; and $\Gamma$ is a predetermined threshold value.

Based on the check performed in Equation 4 above, when $\xi \leq \Gamma$, the value of $\gamma_i$ in Equation 5 is set as $\gamma_i=1$; otherwise, the value of $\gamma_i$ in Equation 5 is set as $\gamma_i=0$. In other words, this embodiment checks a ratio between the largest and smallest uplink interferences among neighboring BSs 110.

Referring again to FIG. 3, once precoder codeword $W_{PMI_{min}}$ is determined, serving BS 110 may calculate a PMI combination ratio (PCR) (340). In some embodiments, PCR may be calculated by apportioning the linear combination of $W_{PMI}$ and $W_{PMI_{min}}$. Serving BS 110 may send the values of PMI, $PMI_{min}$, and PCR to MS 120 (350). In some embodiments, serving BS 110 may also send channel state information $H_j$ for each neighboring BS 110.

Using the values sent from serving BS 110, MS 120 may calculate precoder matrix W (360). In some embodiments, precoder matrix W may be calculated according to Equation 6, as follows:

$$W = \frac{PCR \cdot W_{PMI} + (1-PCR) \cdot W_{PMI_{min}}}{\|PCR \cdot W_{PMI} + (1-PCR) \cdot W_{PMI_{min}}\|}, \quad \text{Equation 6}$$

$$0 \leq PCR \leq 1.$$

Alternatively, MS 120 may receive an actual precoder codeword $W_{PMI_{min}}$ that results in the minimum average interference power between each BS 110 and MS 120, along with $W_{PMI}$ and M, the number of neighboring BSs 110. In this alternative embodiment, precoder matrix W may be determined at serving BS 110 without serving BS 110 receiving channel state information $H_j$ for neighboring BSs 110. Precoder matrix W may be calculated by serving BS 110 according to Equation 7, as follows:

$$W = \frac{PCR \cdot W_{PMI} + \frac{(1-PCR)}{M} \cdot \sum_{j=1}^{M} W_{PMI_{min},j}}{\left\| PCR \cdot W_{PMI} + \frac{(1-PCR)}{M} \cdot \sum_{j=1}^{M} W_{PMI_{min},j} \right\|} \quad \text{Equation 7}$$

wherein $W_{PMI_{min},j}$ is a precoder codeword that results in a minimum average interference value between MS 120 and a $j^{th}$ BS 110; and M is the number of neighboring BSs 110.

Figure 4:
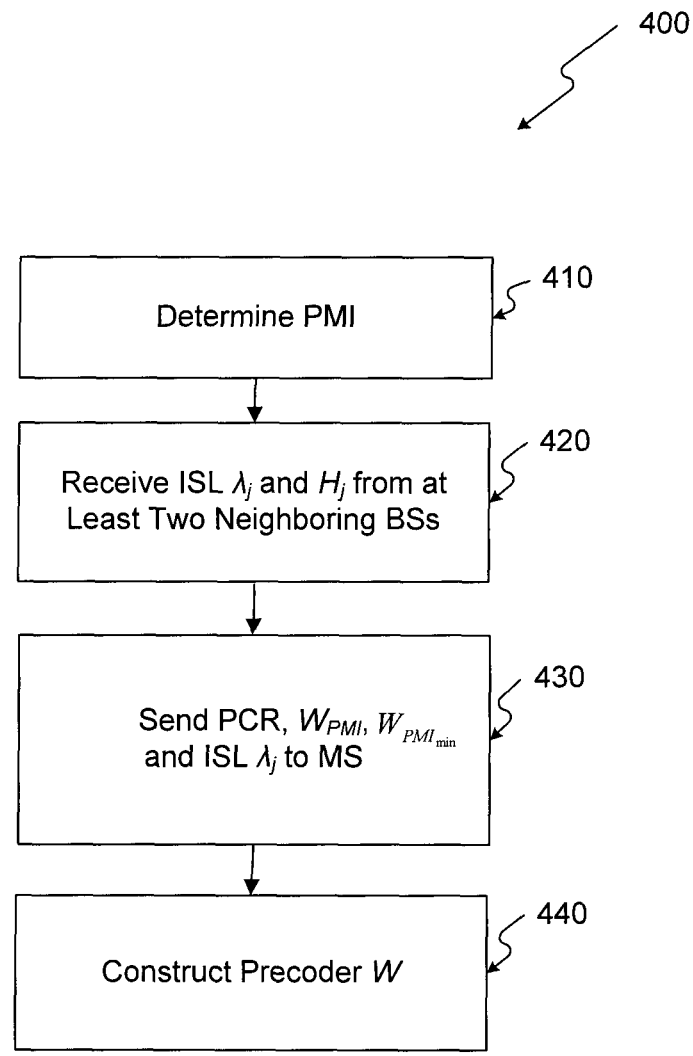
FIG. 4 is a flowchart illustrating exemplary wireless transmission and reception, consistent with certain disclosed embodiments.

FIG. 4 is an exemplary flowchart 400 illustrating MIMO data transmission in a wireless communication system, such as wireless communication system 100, consistent with certain disclosed embodiments. Specifically, FIG. 4 illustrates an embodiment in which a precoder matrix W is calculated using data received from two or more neighboring BSs 110. In the embodiment of FIG. 4, a parameter, referred to herein as interference sensitivity level (ISL) λ, may be used to calculate precoder matrix W. In the embodiment of FIG. 4, the value of ISL λ may be proportional to a tolerable uplink interference for two or more neighboring BSs 110.

As shown in FIG. 4, serving BS 110 may select a precoding matrix index (PMI) for a precoding matrix $W_{PMI_{min}}$ (410). In some embodiments, the PMI may be selected such that a maximum transmission power from an MS 120 to serving BS 110 may be achieved.

BS 110 may receive ISL λ and channel state information $H_j$ from each of two or more neighboring BSs 110 (420). In some embodiments, each of two or more neighboring BSs 110 may calculate its own ISL λ, and send the calculated ISL λ, along with its channel state information $H_j$, to serving BS 110 via backbone communication connections. ISL λ may depend one or more factors, such as, for example, signal power, data traffic condition, service class, etc.

In some embodiments, ISL λ may be quantized to L levels (0, 1, ..., L−1) to indicate a sensitivity of each of two or more neighboring BSs 110 to any additional uplink interference. In some embodiments, the value of ISL λ may decrease with the uplink interference that a neighboring BS 110 can tolerate such that a smaller value of ISL λ may mean a larger interference tolerance, and vice versa. For example, an ISL λ equal to 0 may indicate that a neighboring BS 110 is less concerned about additional interference, whereas an ISL λ equal to L−1 may indicate that a neighboring BS 110 is more sensitive to additional interference. In some embodiments, when an ISL λ for a neighboring BS 110 is equal to 0, the neighboring BS 110 may not send ISL λ and channel state information $H_j$ to serving BS 110, so the overhead in the backbone communication connections may be reduced.

When serving BS 110 receives the ISL λ values and channel state information $H_j$ from two or more neighboring BSs 110, serving BS 110 may calculate the value of α for each of the two or more neighboring BSs 110 (430). In embodiments where $\lambda_j=0$, the value of $\alpha_j$ may be set to 0. Otherwise, the value of α is calculated according to Equation 8, as follows:

$$\alpha_j = \frac{\lambda_j}{\sum_{\substack{i=1 \\ \lambda_i \neq 0}}^{M} \lambda_i}, \quad j = 1...M \qquad \text{Equation 8}$$

wherein
  M is the number of neighboring BSs 110; and
  $\lambda_j$ is an λ ISL for a $j^{th}$ neighboring BS 110.

Serving BS 110 may then select precoder codeword $W_{PMI_{min}}$ based on α and channel state information $H_j$ of the one or more neighboring BSs 110, according to Equation 9 as follows:

$$W_{PMI_{min}} = \operatorname*{argmin}_i \sum_{j=1}^{M} \alpha_j \|H_j W_i\|^2 \qquad \text{Equation 9}$$

wherein
  $H_j$ denotes channel state information between MS 120 and a $j^{th}$ neighboring BS 110;
  M is the number of neighboring BSs 110; and
  $W_i$ is the precoding matrix associated with precoder codebook index i.

In an alternative embodiment, each of the two or more neighboring BSs 110 may calculate its own ISL $\lambda_j$ and $W_{PMI_{min}}$, i.e., $W_{PMI_{min},j}$ and send their individually calculated values of ISL $\lambda_j$ and $W_{PMI_{min},j}$ to serving BS 110. In some embodiments, a larger value of ISL $\lambda_j$ may indicate that the $j^{th}$ neighboring BS 110 is more sensitive to additional interference, whereas a smaller value of ISL $\lambda_j$ may indicate that the $j^{th}$ neighboring BS 110 is less sensitive to additional interference.

Serving BS 110 may send $W_{PMI}$, $W_{PMI_{min},j}$, and ISL $\lambda_j$ of the two or more neighboring BSs 110 to MS 120 (430). Once MS 120 has received $W_{PMI}$, $W_{PMI_{min},j}$, and ISL $\lambda_j$ for the two or more neighboring BSs 110, MS 120 may construct premier W (450). In some embodiments, MS 120 may construct precoder W according to Equation 10, as follows:

$$W = \frac{PCR \cdot W_{PMI} + (1-PCR) \cdot \sum_{j=1}^{M} \frac{\lambda_j}{\sum \lambda} W_{PMI_{min},j}}{\left\| PCR \cdot W_{PMI} + (1-PCR) \cdot \sum_{j=1}^{M} \frac{\lambda_j}{\sum \lambda} W_{PMI_{min},j} \right\|}. \qquad \text{Equation 10}$$

In an alternative embodiment, in order to further reduce the overhead complexity in both backbone and air-interface, ISL $\lambda_j$ of each of the two or more neighboring BSs 110 may be set to 1, indicating the assumption that each of the two or more neighboring BSs 110 are equally sensitive to uplink interference. In this embodiment, the two or more neighboring BSs 110 may not send the value of ISL $\lambda_j$ to serving BS 110, and serving BS 110 may only send $W_{PMI}$, $W_{PMI_{min},j}$, and M (the total number of neighboring BSs 110) to MS 120 from which MS 120 may construct precoder W. In some embodiments, MS 120 may construct precoder W according to Equation 11, as follows:

$$W = \frac{PCR \cdot W_{PMI} + \frac{(1-PCR)}{M} \cdot \sum_{j=1}^{M} W_{PMI_{min},j}}{\left\| PCR \cdot W_{PMI} + \frac{(1-PCR)}{M} \cdot \sum_{j=1}^{M} W_{PMI_{min},j} \right\|}. \qquad \text{Equation 11}$$

The embodiments disclosed may be applied using 3GPP standards and technologies, as well as wireless communications systems utilizing the Institute of Electrical and Electronics Engineers (IEEE) 802.16 family of standards and technologies. For example, the disclosed embodiments be used in a wireless communication system using Worldwide Interoperability for Microwave Access (WiMAX), which is promulgated by the WiMax Forum, and is based on the IEEE 802.16 family of standards and technologies.

The apparatus and methods disclosed herein may be configured to prevent signals from different transmission nodes from being destructive to each other, thereby causing macrodiversity gain to be lost. In addition, the apparatus and methods disclosed herein may reduce computational costs associated with more exhaustive search methods, and reduce the amount of feedback overhead. In this manner, the disclosed embodiments may reduce signal processing time and improve data traffic flow associated with signal transmission in any type of wireless network. Similarly, the methods and apparatus as described in connection with the disclosed embodiments may be configured to operate in any transmitting and/or mobile station.

It will be apparent to those skilled in the art that various modifications and variations can be made in the system and method for reception in communication networks. It is intended that the standard and examples be considered as exemplary only, with a true scope of the disclosed embodiments being indicated by the following claims and their equivalents.

What is claimed is:

1. A method for generating a precoder for uplink transmission from a mobile station, comprising:
   receiving information corresponding to a first precoding matrix;
   receiving information corresponding to at least two second precoding matrices, each of the at least two second precoding matrices corresponding to one of at least two neighboring base stations;
   receiving information corresponding to an interference sensitivity level (ISL) $\lambda_j$ for each of the at least two neighboring base stations; and
   generating the precoder by linearly combining the first precoding matrix and the at least two second precoding matrices,
   wherein the first precoding matrix maximizes transmission power between the mobile station and a serving base station, and the at least two second precoding matrices minimize interference power between the mobile station and a respective one of the neighboring base stations.

2. The method of claim 1, wherein the precoder is generated according to:

$$W = \frac{PCR \cdot W_{PMI} + (1 - PCR) \cdot \sum_{j=1}^{M} \frac{\lambda_j}{\sum \lambda} W_{PMI_{min},j}}{\left\| PCR \cdot W_{PMI} + (1 - PCR) \cdot \sum_{j=1}^{M} \frac{\lambda_j}{\sum \lambda} W_{PMI_{min},j} \right\|},$$

wherein:
   M is a total number of the at least two neighboring base stations,
   $\lambda_j$ is a $j^{th}$ ISL $\lambda$ of the jth base station and is associated with a $j^{th}$ base station of the at least two neighboring base stations,
   $W_{PMI}$ is the received second precoding matrix,
   $W_{PMI_{min},j}$ is a $j^{th}$ precoding matrix and is associated with a $j^{th}$ base station of the at least two neighboring base stations, and
   PCR is a precoding matrix index (PMI) combination ratio.

3. An apparatus for generating a precoder for uplink transmission to a plurality of base stations, the apparatus comprising:
   at least one memory to store data and instructions; and
   at least one processor configured to access the at least one memory and, when executing the instructions, to:
   receive information corresponding to a first precoding matrix;
   receive information corresponding to at least two second precoding matrices, each of the at least two second precoding matrices corresponding to one of at least two neighboring base stations;
   receive information corresponding to an interference sensitivity level (ISL) $\lambda_j$ for each of the at least two neighboring base stations; and
   generate the precoder by linearly combining the first precoding matrix and the at least two second precoding matrices,
   wherein the first precoding matrix maximizes transmission power between the mobile station and a serving base station, and the at least two second precoding matrices minimize interference power between the mobile station and a respective one of the neighboring base stations.

4. The apparatus of claim 3, wherein the precoder is generated according to:

$$W = \frac{PCR \cdot W_{PMI} + (1 - PCR) \cdot \sum_{j=1}^{M} \frac{\lambda_j}{\sum \lambda} W_{PMI_{min},j}}{\left\| PCR \cdot W_{PMI} + (1 - PCR) \cdot \sum_{j=1}^{M} \frac{\lambda_j}{\sum \lambda} W_{PMI_{min},j} \right\|},$$

wherein:
   M is a total number of the at least two neighboring base stations,
   $\lambda_j$ is a $j^{th}$ ISL $\lambda$ of the jth base station and is associated with a $j^{th}$ base station of the at least two neighboring base stations,
   $W_{PMI}$ is the received second precoding matrix,
   $W_{PMI_{min},j}$ is a $j^{th}$ precoding matrix and is associated with a $j^{th}$ base station of the at least two neighboring base stations, and
   PCR is a precoding matrix index (PMI) combination ratio.

5. A method for generating a precoder for uplink transmission from a mobile station in a wireless communication system, comprising:
   selecting, by a serving base station, a precoding matrix index (PMI);
   receiving, by the serving base station, a set of interference sensitivity levels (ISL), wherein each value in the set of ISL is received from a respective one of a plurality of neighboring base stations;
   receiving, by the serving base station, a set of minimum PMIS ($PMIs_{min}$), wherein each $PMI_{min}$ in the set of $PMIs_{min}$ is received from a respective one of the plurality of neighboring base stations;
   selecting, by the serving base station, a PMI combination ratio (PCR); and
   transmitting, by the serving base station, the PMI, the set of ISL, the set of $PMIs_{min}$, and the PCR to the mobile station to generate the precoder.

6. An apparatus for generating a precoder for uplink transmission from a mobile station in a wireless communication system, the apparatus comprising:
   at least one memory to store data and instructions; and
   at least one processor configured to access the at least one memory and, when executing the instructions, to:
   select a precoding matrix index (PMI);
   receive a set of interference sensitivity levels (ISL), wherein each value in the set of ISL is received from a respective one of a plurality of neighboring base stations;
   receive a set of minimum PMIs ($PMIs_{min}$), wherein each $PMI_{min}$ in the set of $PMIs_{min}$ is received from a respective one of the plurality of neighboring base stations;
   select a PMI combination ratio (PCR); and
   transmit the PMI, the set of ISL, the set of $PMIs_{min}$, and the PCR to the mobile station to generate the precoder.

* * * * *